US008638318B2

(12) United States Patent
Gao et al.

(10) Patent No.: US 8,638,318 B2
(45) Date of Patent: Jan. 28, 2014

(54) MULTI-LAYER COVERSHEET FOR SAW TOUCH PANEL

(75) Inventors: Ting Gao, Sunnyvale, CA (US); Jorge G. Loayza, Campbell, CA (US); Joel C. Kent, Fremont, CA (US)

(73) Assignee: ELO Touch Solutions, Inc., Milpitas, CA (US)

( * ) Notice: Subject to any disclaimer, the term of this patent is extended or adjusted under 35 U.S.C. 154(b) by 437 days.

(21) Appl. No.: 12/789,733

(22) Filed: May 28, 2010

(65) Prior Publication Data

US 2011/0291996 A1  Dec. 1, 2011

(51) Int. Cl.
*G06F 3/043* (2006.01)

(52) U.S. Cl.
USPC ............................................ 345/177; 345/173

(58) Field of Classification Search
USPC ...................... 345/173–179; 178/18.04–18.07
See application file for complete search history.

(56) References Cited

U.S. PATENT DOCUMENTS

| 4,746,914 | A | | 5/1988 | Adler |
| 5,109,177 | A | * | 4/1992 | Grellmann et al. ....... 310/313 R |
| 5,451,723 | A | | 9/1995 | Huang et al. |
| 7,006,081 | B2 | | 2/2006 | Kent et al. |
| 7,764,276 | B2 | * | 7/2010 | Schermerhorn .............. 345/177 |
| 8,144,453 | B2 | * | 3/2012 | Brown et al. ............. 361/679.21 |
| 2002/0104691 | A1 | * | 8/2002 | Kent et al. .................. 178/18.04 |
| 2002/0149571 | A1 | * | 10/2002 | Roberts .......................... 345/174 |
| 2003/0148033 | A1 | * | 8/2003 | Tsai .............................. 427/402 |
| 2004/0164970 | A1 | * | 8/2004 | Benard et al. ................. 345/177 |
| 2004/0239647 | A1 | * | 12/2004 | Endo .............................. 345/173 |
| 2005/0073505 | A1 | * | 4/2005 | Katsuki et al. ................ 345/173 |
| 2007/0176907 | A1 | * | 8/2007 | Ishii .............................. 345/177 |
| 2008/0030485 | A1 | * | 2/2008 | Endo et al. .................... 345/177 |
| 2008/0106528 | A1 | * | 5/2008 | Chang et al. .................. 345/177 |
| 2008/0180399 | A1 | * | 7/2008 | Cheng ........................... 345/173 |
| 2009/0066670 | A1 | * | 3/2009 | Hotelling et al. ............. 345/174 |
| 2009/0193985 | A1 | | 8/2009 | Bussert et al. |
| 2009/0284485 | A1 | * | 11/2009 | Colgate et al. ................ 345/173 |
| 2010/0001963 | A1 | * | 1/2010 | Doray et al. .................. 345/173 |

(Continued)

FOREIGN PATENT DOCUMENTS

| EP | 1813977 A1 | 8/2007 |
| JP | 2007-079737 | 10/2008 |

(Continued)

OTHER PUBLICATIONS

International Search Report for International Application No. PCT/US2001/037446 and Written Opinion mailed Sep. 15, 2011.

*Primary Examiner* — Alexander Eisen
*Assistant Examiner* — Nelson Lam
(74) *Attorney, Agent, or Firm* — Alston & Bird LLP

(57) ABSTRACT

A touch panel includes a surface acoustic wave propagating substrate having top and bottom surfaces and a multi-layer coversheet that is positioned over the substrate. The coversheet includes a load-spreading layer, a compliant layer and an anti-sticking layer. The load-spreading layer has top and bottom surfaces, and the top surface receives touch input from an object. The compliant layer has top and bottom surfaces and the top surface of the compliant layer is coupled to the bottom surface of the load-spreading layer. The anti-sticking layer has top and bottom surfaces and the top surface of the anti-sticking layer is coupled to the bottom surface of the compliant layer. The bottom surface of the anti-sticking layer is positioned proximate to the top surface of the substrate.

20 Claims, 5 Drawing Sheets

(56) References Cited

U.S. PATENT DOCUMENTS

| | | |
|---|---|---|
| 2010/0164890 A1* | 7/2010 | Lee et al. .................... 345/173 |
| 2010/0219717 A1* | 9/2010 | Takai et al. ............... 310/313 C |
| 2011/0084941 A1* | 4/2011 | Yeh et al. .................... 345/177 |
| 2011/0234545 A1 | 9/2011 | Tanaka et al. |

FOREIGN PATENT DOCUMENTS

| | | |
|---|---|---|
| JP | 2009-003672 | 7/2009 |
| WO | WO 95/11499 A1 | 4/1995 |
| WO | WO 2008/020699 A1 | 2/2008 |

* cited by examiner

MULTI-LAYER COVERSHEET FOR SAW TOUCH PANEL

BACKGROUND OF THE INVENTION

This invention relates generally to touch sensitive systems, and more particularly to touch panels that detect surface acoustic waves (SAW).

Touch sensitive systems are used to provide two-dimensional coordinate information. One example may be an opaque track pad while another example may be a transparent touch panel placed in front of a display such as a liquid crystal display. Touch sensitive systems are used in many different applications, including small hand-held devices such as phones, cameras and personal digital assistants, and including larger desktop applications such as touch systems for restaurants, banks and automated teller machines, museums and the like.

Conventional SAW touch panels have a number of limitations including vulnerability to false activations from liquid contaminants, and lack of response to a pointed stylus. As the marketplace finds value in the detection of more than one simultaneous touch, such as with two finger zoom gestures, the inherent multi-touch capabilities of SAW become more attractive. However, with conventional SAW touch panels two finger gestures with fingernail touch contact are not supported. In the past a layered SAW coversheet with an exterior load-spreading layer and an interior compliant layer has been proposed to address these issues. However, known SAW coversheet designs force an undesirable trade-off between touch sensitivity and the need to avoid sticking failures, wherein the compliant layer does not immediately release from the substrate when a touch is removed. There is an unmet need for a SAW coversheet solution that provides a desired level of touch sensitivity without the aforementioned sticking problem.

BRIEF DESCRIPTION OF THE INVENTION

In one embodiment, a touch panel includes a surface acoustic wave propagating substrate having top and bottom surfaces and a multi-layer coversheet that is positioned over the substrate. The coversheet includes a load-spreading layer, a compliant layer and an anti-sticking layer. The load-spreading layer has top and bottom surfaces, and the top surface receives touch input from an object. The compliant layer has top and bottom surfaces and the top surface of the compliant layer is coupled to the bottom surface of the load-spreading layer. The anti-sticking layer has top and bottom surfaces and the top surface of the anti-sticking layer is coupled to the bottom surface of the compliant layer. The bottom surface of the anti-sticking layer is positioned proximate to the top surface of the substrate.

In one embodiment, a touch panel includes a surface acoustic wave propagating substrate having top and bottom surfaces and a multi-layer coversheet that is positioned over the substrate. The coversheet includes a flexible display layer, a compliant layer and an anti-sticking layer. The flexible display layer has top and bottom surfaces and displays an image. The top surface receives touch input from an object. The compliant layer has top and bottom surfaces. The top surface of the compliant layer is coupled to the bottom surface of the flexible display layer. The anti-sticking layer has top and bottom surfaces, and the top surface of the anti-sticking layer is coupled to the bottom surface of the compliant layer. The bottom surface of the anti-sticking layer is positioned proximate to the top surface of the substrate.

DETAILED DESCRIPTION OF THE INVENTION

Figure 1:
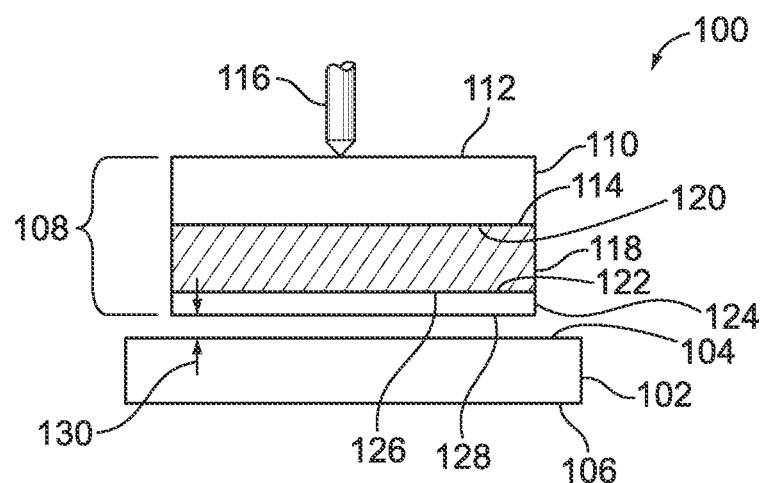
FIG. 1 illustrates a surface acoustic wave (SAW) touch panel that has a multi-layer coversheet formed in accordance with an embodiment of the present invention.

The foregoing summary, as well as the following detailed description of certain embodiments of the present invention, will be better understood when read in conjunction with the appended drawings, which are not drawn to scale. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

FIG. 1 illustrates a SAW touch panel 100. A substrate 102 supports propagation of surface acoustic waves or beams. The substrate 102 has a top surface 104 and a bottom surface 106. Transmitters, arrays, receivers and the like that generate and detect SAW are mounted, formed, and the like on the top surface 104 and/or edges of the substrate 102 and are discussed further below. The substrate 102 may be glass a low-acoustic-loss polymer such as polystyrene, metal, such as aluminum, or any other material or composite capable of propagating SAW. In general, SAW may be used to indicate any one or a combination of Rayleigh waves, quasi-Rayleigh waves, Lamb or shear waves, or other types of acoustic waves that are sensitive to a touch on the top surface 104 of the substrate 102. (Despite "SAW" being used as a synonym for "Rayleigh wave" is some of the technical literature, here "SAW" is defined more broadly.)

A multi-layer coversheet 108 is positioned over the substrate 102. The coversheet 108 includes three layers and supports the detection of single touches as well as multi-touch (i.e. more than one simultaneous touch), gestures such as, but not limited to, zoom. In additional to fingertip input, touch response is also provided by fingernail contact and object input such as by credit card and other hard and firm objects. A static touch is detected and in a hold state as long as contact is maintained. An exterior load-spreading layer 110 has a top surface 112 and a bottom surface 114. A middle compliant layer 118 has a top surface 120 and a bottom surface 122. The top surface 120 of the compliant layer 118 is coupled to the bottom surface 114 of the load-spreading layer 110. A bottom anti-sticking layer 124 has a top surface 126 and a bottom surface 128. The top surface 126 of the anti-sticking layer 124 is coupled to the bottom surface 122 of the compliant layer 118.

The top surface 112 of the load-spreading layer 110 receives a touch from a user. As discussed above, the touch may be accomplished using an object 116 such as an active finger or fingertip, a non-active fingernail, credit card or other object, or a non-active stylus as shown. Generally, the term "object 116" is used herein to indicate any object, including a part of a user's hand, that is used to make a selection or input data on the touch panel 100, and thus is not limited to the physical shape and/or configuration as shown. The term "non-active" indicates simply that the object 116 does not include a sensor, magnet, or other device, as such devices are not required to generate a touch. Instead, a touch is responsive to force by the object 116 on the load-spreading layer 110 that results in a minimum contact area.

A small gap 130 exists between the bottom surface 128 of the anti-sticking layer 124 and the top surface 104 of the substrate 102. When a touch, such as the object 116, presses on the top surface 112, the coversheet 108 is deflected such that a corresponding area of the bottom surface 128 interrupts the SAW being transmitted on the substrate 102. In some embodiments in which the bottom surface 128 is not smooth, even when a touch is not present the bottom surface 128 may contact the top surface 104 of the substrate 102 at a plurality of very small points of contact while still not generating a touch response; in this case in an engineering drawing there may be no apparent gap, such as the gap 130, between bottom surface 128 and substrate top surface 104.

The materials used for the layers within the coversheet 108 may be selected based on properties such as durability, transparency, processability or manufacturability, cost and mechanical reaction to compression. Additional considerations may also be hardness and stiffness (of the material considered alone or in contrast to another material). As used herein, "hard", "harder", "soft" and "softer" are used to describe a material property. The term "stiff" or "stiffness" may be used to describe a behavior of a sample of material with a defined geometry.

Reliable detection via SAW attenuation is provided if a touch contact area on substrate 102 exceeds a minimum area. The quantitative value of this minimum area depends on the operating frequency and sensitivity of associated electronics. For example, for an operating frequency of 5 MHz and electronics of current SAW touchscreen products, the minimum touch contract area diameter is typically in the range from 2 mm to 10 mm. At higher operating frequencies, the minimum contact area will generally be smaller. The load-spreading layer 110 serves to assure that the force from any applied touch force or load, no matter how point-like the object 116, is spread out to cover at least the minimum contact area for reliable detection of SAW attenuation. The load-spreading layer 110 requires sufficient stiffness to spread out the force (but not so much stiffness that the touch force is too spread out for accurate coordinate detection). Here "stiffness" is a synonym for bending or flexural rigidity "D" such as expressed in the following equation for a homogenous layer of thickness "t", Young's modulus "E" and Poisson's ratio ν.

$$D = E \cdot t^3 / \{12 \cdot (1-\nu^2)\} \qquad \text{Equation 1}$$

The load-spreading layer 110 may be formed of a very hard material with a large value of Young's modulus E such as glass or a material with a more modest value of Young's modulus E such as a polymer such as polyethylene terephthalate (PET), polyethylene naphthalate (PEN), acrylic or mylar. Lower values of Young's modulus E may be compensated by larger values of layer thickness t. For example, a factor of 2 increase in thickness t may compensate for a factor 8 decrease in Young's modulus E. In one embodiment the load-spreading layer 110 may be formed of glass with a thickness in the range from 50 microns to 300 microns. In another embodiment, the load-spreading layer 110 may be formed of PET with thickness in the range from 100 microns to 600 microns. The top surface 112 may be smooth and not tacky or sticky. It should be understood that the thicknesses of the layers within the coversheet 108 may not be shown to scale in FIG. 1.

By itself, the load-spreading layer 110 does not assure intimate acoustic contact over the desired minimum contact area. However, intimate acoustic contact may be assured with the addition of an under layer of a soft or compliant layer. The compliant layer 118 may be formed of a material that is relatively softer (e.g. having a smaller value of Young's modulus E) than the load-spreading layer 110. The ability of the compliant layer 118 to conform to the top surface 104 of substrate 102 within the desired contact area depends on both the softness (smallness of Young's modulus E) of the layer material as well as the thickness of the compliant layer 118. In general, the thinner the compliant layer 118, the softer the material may be. For example, the compliant layer 118 may be an elastomeric material or elastomer and may be selected based on the level of sensitivity, or transference of force from the outer touch surface to the substrate 102, and touch response is achieved using the desired input object 116, as well as the desired level of transparency. In one embodiment, the compliant layer 118 may be formed of an EPDM rubber (ethylene propylene diene Monomer (M-class) rubber) such as Vistalon™ EPDM, a plastomer, Vistamaxx™ (a propylene-based elastomer), an Exact™ Plastomer (low density ethylene copolymer), an ENGAGE™ polyolefin elastomer such as ENGAGE 8401, or other materials that have the desired properties. The compliant layer may be coated, printed, laminated, heated to melt and/or co-extruded on the bottom surface 114 of the load-spreading layer 110. In one embodiment, the compliant layer 118 may have a thickness between 75 and 500 microns, and in another embodiment the compliant layer 118 may have a thickness of up to 750 microns. The thickness of the load-spreading layer 110 and the compliant layer 118 may be selected to maximize properties such as deflection and response, and may also be based on the application of the touch panel 100, type of object expected to be used to generate touch, and the like. The bottom surface 114 of the load-spreading layer 110 may be coupled to the top surface 120 of the compliant layer 118 by heat, lamination, and the like. It should be understood that other joining methods may be used and may depend upon the selected materials.

Unfortunately, known SAW coversheet solutions disadvantageously limit the choice of materials for the compliant layer 118. Highly compliant materials tend to stick to the substrate top surface 104, often causing failures where the detection of the touch undesirably persists even after the object or stylus has been removed. Use of less compliant materials for compliant layer 118 to avoid sticking problems often results in loss of touch sensitivity or an undesirably thick compliant layer 118. However, the addition of the anti-sticking layer 124 prevents the compliant layer 118 from sticking to the top surface 104 of the substrate 102. Provided that the anti-sticking layer 124 is sufficiently flexible, the inclusion of the anti-sticking layer 124 in the coversheet 108 resolves the sticking problem while simultaneously does not interfere with the intimate acoustic contact with substrate 102 provided by the softness of the compliant layer 118. Sufficient flexibility for anti-sticking layer 124 may be provided even with relatively hard materials (e.g. materials having relatively large values of Young's modulus) such as if the anti-sticking layer 124 is very thin. The anti-sticking layer 124 may be formed of a number of materials such as an anti-sticking fluorocarbon solid polymer (or polytetrafluoroethyelene), polysiloxane, or polymer composites, a thin transparent (if necessary) metal/inorganic/ceramic material, such as indium tin oxide (ITO), silica, and the like, but is not so limited. In some embodiments the anti-sticking layer 124 may also be referred to as a coating or a film. The anti-sticking layer 124 may be coated, evaporated, sprayed, plasma treated, printed, laminated, heated to melt and/or co-extruded on the bottom surface 122 of the compliant layer 118. The anti-sticking layer 124 may be relatively thin in comparison to the other layers in the coversheet 108 to maximize sensitivity. In some embodiments, the thickness of the anti-sticking layer 124 is just enough to provide the desired anti-sticking performance, such as up to 10 microns. It should be understood that the thickness may be determined, at least in part, by the material used as well as the application process. In some embodiments, the anti-sticking layer 124 may not completely cover the bottom surface 122 of the compliant layer 118. In other embodiments, the anti-sticking layer 124 may have some degree of roughness on the bottom surface 128.

Figure 2:
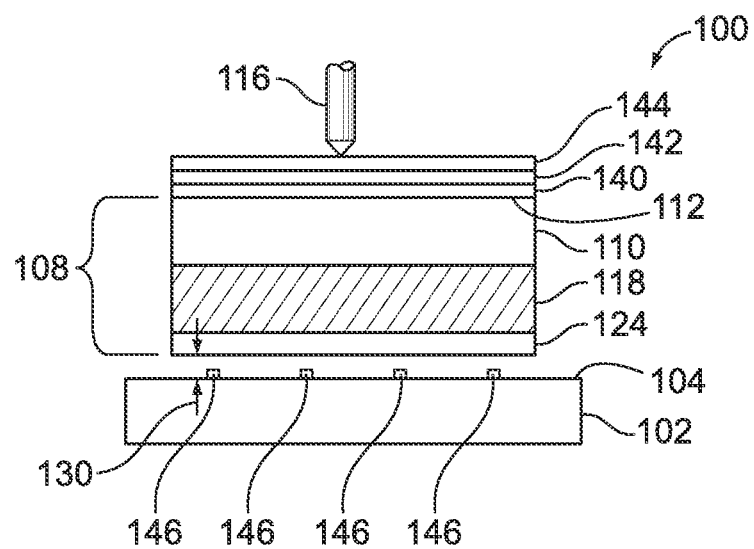
FIG. 2 illustrates the touch panel of FIG. 1 with one or more additional layers added to the multi-layer coversheet in accordance with an embodiment of the present invention.

FIG. 2 illustrates the touch panel 100 of FIG. 1 having the coversheet 108 positioned over the substrate 102. One or more additional layers may be added to the top surface 112 of the load-spreading layer 110. For example, a hard coat layer 140, which may be a thin scratch resistant polymer layer, may be used. The hard coat layer 140 may provide scratch resistance to the top surface 112 of the load-spreading layer 110. An optical layer 142, such as an anti-glare surface treatment or an anti-reflective coating, may be used. Also, a hydrophobic layer 144 may be used to improve water repelling. In one embodiment the hydrophobic layer 144 may be only several molecules thick. It should be understood that one or more of the layers 140, 142, and 144 may be used, and that the layers may be applied in an order over the top surface 112 that may be different than what is shown. Although not shown, there may be an additional "release liner" that is positioned on the outer-most layer or surface and is replaceable, providing increased scratch resistance and/or protection.

In one embodiment, one or more spacers 146 may be positioned on the top surface 104 of the substrate 102. The spacers 146 may improve the release of the anti-sticking layer 124 from the top surface 104 after a touch is removed from the touch surface.

Figure 3:
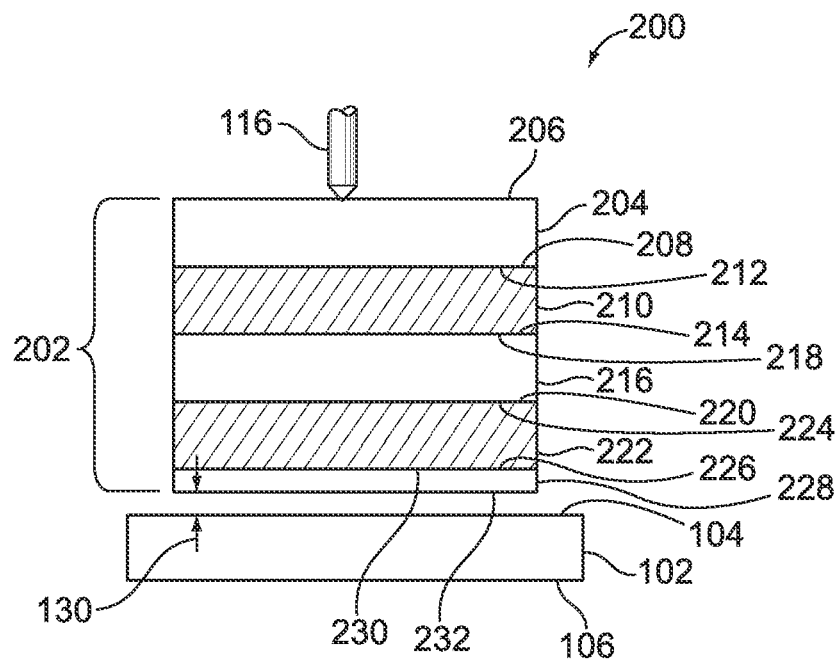
FIG. 3 illustrates another SAW touch panel that has a multi-layer coversheet formed in accordance with an embodiment of the present invention.

In some embodiments, the coversheet 108 may include additional layers. FIG. 3 illustrates another SAW touch panel 200 that has a multi-layer coversheet 202. Items that are similar to those discussed previously with respect to FIG. 1 are given like item numbers. For example, the coversheet 202 is positioned a distance, such as the gap 130, over the top surface 104 of the substrate 102.

In the embodiment shown in FIG. 3, the coversheet 202 includes two additional layers compared to the coversheet 108 of FIG. 1. A stiff exterior load-spreading layer 204 has top and bottom surfaces 206 and 208. The user may use the object 116 on the top surface 206 to input data and make selections on the touch panel 200. A first compliant layer 210 has top and bottom surfaces 212 and 214. The top surface 212 of the first compliant layer 210 is coupled to the bottom surface 208 of the load-spreading layer 204. An additional load-spreading layer 216 has top and bottom surfaces 218 and 220, and the top surface 218 is coupled to the bottom surface 214 of the first compliant layer 210. A second compliant layer 222 has top and bottom surfaces 224 and 226, and the top surface 224 is coupled to the bottom surface 220 of the load-spreading layer 216. An anti-sticking layer 228 has top and bottom surfaces 230 and 232, and the top surface 230 is coupled to the bottom surface 226 of the second compliant layer 222.

The load-spreading layers 204 and 216 are both formed of a relatively stiff and hard material compared to the first and second compliant layers 210 and 222. The load-spreading layers 204 and 216 may be formed of the same or different materials, and the first and second compliant layers 210 and 22 may be formed of the same or different materials. The load-spreading layers 204 and 216 may be formed of glass, glass microsheet, PET or other material as discussed above with respect to the load-spreading layer 110 of FIG. 1. The first and second compliant layers 210 and 222 may be formed of material or materials as discussed above with respect to the compliant layer 118. The anti-sticking layer 228 is formed of an anti-sticking material to prevent the coversheet 202 from adhering or sticking to the top surface 104 of the substrate 102 when deflected by touch(es).

The materials used and the thicknesses of each of the layers may be selected based on desired performance, type of object 116 expected to be used, and the functional use of the touch panel 200. For example, sensitivity, such as how much force is needed for a touch to deflect the coversheet 202 and generate a touch event, may be adjusted based on the thicknesses of the layers, hardness of each of the layers, the number of layers in the coversheet 202, properties of the anti-sticking layer 228, and the like.

In one embodiment, additional layers (not shown) may be included in the coversheet 202, such as an additional load-spreading layer such as glass or PET paired with an additional compliant layer. In some embodiments, sensitivity may be improved by using more layers, as more layers may result in an increased touch area on the top surface 104 of the substrate 102. Also, the sensitivity may vary based on the object size and pressure of the object 116.

Figure 4:
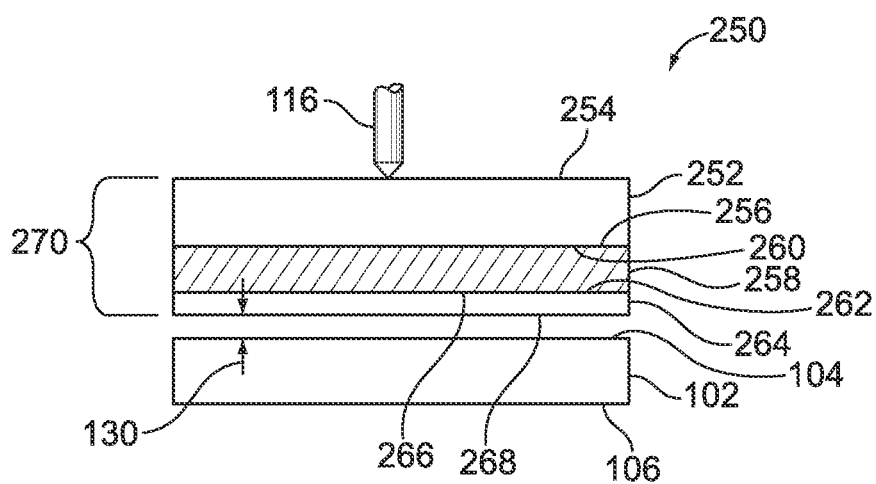
FIG. 4 illustrates an embodiment wherein a SAW coversheet of a touch panel, formed in accordance with an embodiment of the present invention, includes a flexible display layer.

FIGS. 1-3 illustrate touch panels 100 and 200 that are configured to either be positioned in front of a display, such as a liquid crystal display (LCD), or to function as a trackpad separate from a display. In contrast, FIG. 4 illustrates an embodiment wherein SAW coversheet 270 of touch panel 250 includes a flexible display layer 252. One option for a flexible display layer is an Organic Light Emitting Diode (OLED) display. Another example of a flexible display is an ElectroPhoretic Display (EPD). In contrast to LCDs, OLEDs and EPDs may be fabricated on a flexible or stiff substrate, have lower power consumption, and better performance under bright conditions, such as sunlight.

The flexible display layer 252 has top and bottom surfaces 254 and 256. In an embodiment, the flexible display layer 252 may include a substrate, such as a 100 micron thick glass substrate, upon which very thin OLED components (e.g. diodes as well as other connections and the like) are fabricated. The OLED components may be sealed by another layer, such as a 50 micron glass layer or equivalent. The top surface 254 is the touch sensing surface for receiving input from the object 116. A compliant layer 258 has top and bottom surfaces 260 and 262, and the top surface 260 is coupled to the bottom surface 256 of the flexible display layer 252. The compliant layer 258 may be formed of an elastomeric material as discussed previously. An anti-sticking layer 264 has top and bottom surfaces 266 and 268, and the top surface 266 is coupled to the bottom surface 262 of the compliant layer 258. The anti-sticking layer 264 is formed of an anti-stick material and may be a layer or coating as previously discussed. The top surface 104 of the substrate 102 is separated from the bottom surface 268 of the anti-sticking layer 264 by the gap 130.

The substrate (not shown) of the flexible display layer 252 is stiff enough to spread out the forces from a point-like touch of the object 116, resulting in a detectable touch area on the top surface 104 of the substrate 102. Although not shown, additional layers and/or coatings may be used, such as to protect the top surface 254 of the flexible display layer 252. Flexible display layer 252 needs only to be sufficiently flexible to serve as a load-spreading layer, that is, not be so stiff that touch forces are so spread out as to lead to poor touch sensitivity or poor coordinate measurements. Flexible display layer 252 need not be considered flexible by other standards, such as an ability to be rolled up like a scroll.

The substrate 102 is the SAW travel surface with transducers and reflection arrays mounted thereon or integral with as discussed below. Because the flexible display layer 252 is between the user and the substrate 102, the substrate 102 may be transparent or opaque. The substrate 102 may be formed of glass or other substantially transparent material, or metal such as aluminum may be used. In some embodiments, metal may propagate SAW better than glass and may be easier to process than glass.

It should be understood that according to some embodiments, one or more addition intervening layer may be used in the embodiments of FIGS. 1-4. Therefore, layers may be coupled to each other directly or indirectly.

Figure 5:
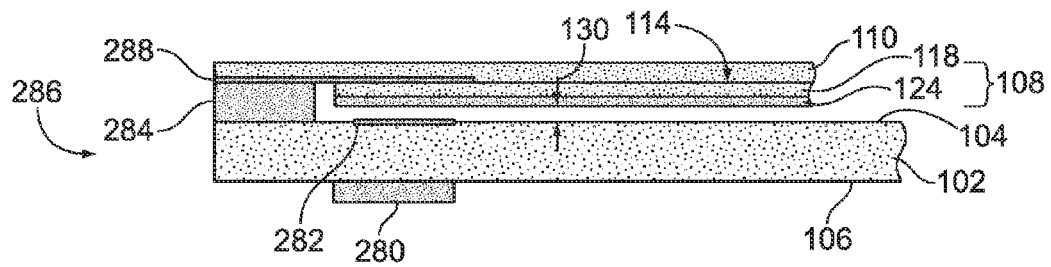
FIG. 5 illustrates a side cross-section of the attachment of the SAW coversheet to the SAW touch panel in accordance with an embodiment of the present invention.

FIG. 5 illustrates a side cross-section of the attachment of the SAW coversheet to the SAW touch panel. In this example, some like item numbers of the coversheet 108 of FIG. 1 will be used in the discussion, but it should be understood that this attachment method and configuration may be used with other coversheets. The load-spreading layer 110, compliant layer 118, anti-sticking layer 124 and substrate 102 are shown. In addition, a piezo 280 is mounted to the bottom surface 106 of the substrate 102 and grating 282 is mounted to the top surface 104 of the substrate 102. In another embodiment, in addition to or instead of the grating 282, arrays and/or beam splitters may be mounted to the top surface 104.

In the embodiment shown, the coversheet 108 is bonded to the substrate 102. Both the load-spreading layer 110 and the substrate 102 extend in length beyond the length of the compliant layer 118 and the anti-sticking layer 124. A spacer 284 is used along an outer edge 286 and may extend entirely or partially along the four sides of the substrate 102. In another embodiment, a plurality of separate spacers 284 may be used. The spacer 284 is joined to both the load-spreading layer 110 and the substrate 102 using an adhesive to maintain the coversheet 108 and the substrate 102 in a desired relationship with respect to each other. The height of the spacer 284 (e.g. the distance between the top surface 104 and the bottom surface 114 is selected to maintain the desired gap 130. In one embodiment, a black or other opaque paint 288 or other opaque substance may be used between the load-spreading layer 110 and the spacer 284, extending partially between the load-spreading layer 110 and the compliant layer 118. This may prevent the piezo 280 and the grating 282 from being visible to a user of the touch panel 100 when the layers 110, 118 and 124 are transparent.

Figure 6:
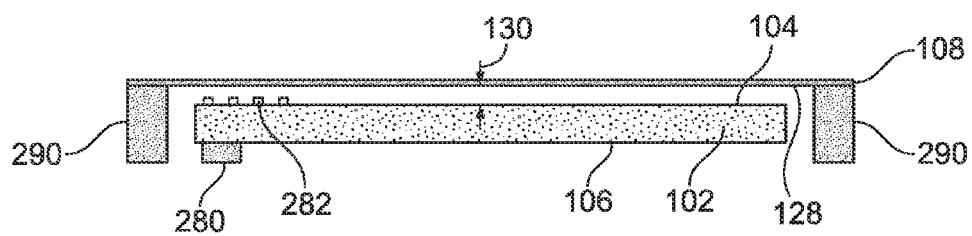
FIG. 6 illustrates another side cross-section of the attachment of the SAW coversheet with respect to the SAW touch panel in accordance with an embodiment of the present invention.

FIG. 6 illustrates another side cross-section of the attachment of the SAW coversheet with respect to the SAW touch panel. In this example, the coversheet, such as coversheet 108 of FIG. 1, is illustrated as a single rectangular block. The coversheet 108, such as the bottom surface 128 of the anti-sticking layer 124 (as illustrated in detail in FIG. 1) is bonded to a support frame 290. The support frame 290 may be configured to extend entirely around the perimeter of the coversheet 108. The support frame 290 may in turn be bonded or otherwise connected to other structure that also supports the substrate 102. For example, support frame 290 may be only a portion of and integral to a larger housing designed to contain both a display and SAW touch panel. A piezo 280 is joined to the bottom surface 106 of the substrate 102 and a grating 282 is joined to the top surface 104.

Figure 7:
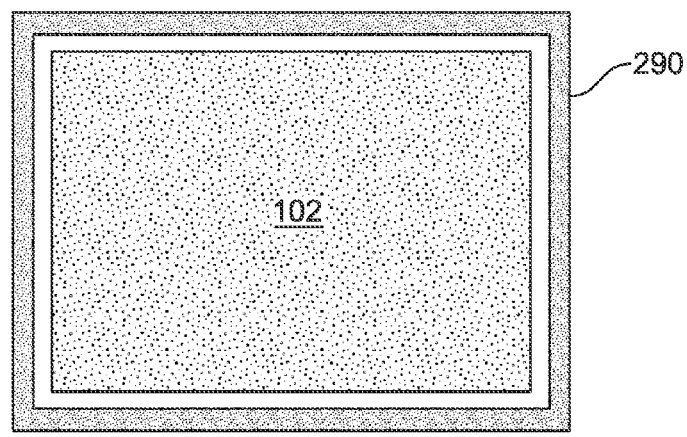
FIG. 7 illustrates a top plan view of the support frame surrounding the substrate in accordance with an embodiment of the present invention.

For clarity, FIG. 7 illustrates a top plan view of the support frame 290 surrounding the substrate 102. The coversheet 108 is not shown in this figure. Outer edges of the coversheet may be bonded or coupled to the support frame 290, holding the coversheet in a desired relation with respect to the support frame 290. Advantageously, the SAW touch panel may be of a design with no transducer structures or reflective arrays on the top surface 104 such as SAW touch panel designs disclosed in US patent application entitled "Bezel-less Acoustic Touch Apparatus", Ser. No. 12/732,132, filed on Mar. 25, 2010, which is herein incorporated by reference in its entirety.

Figure 8:
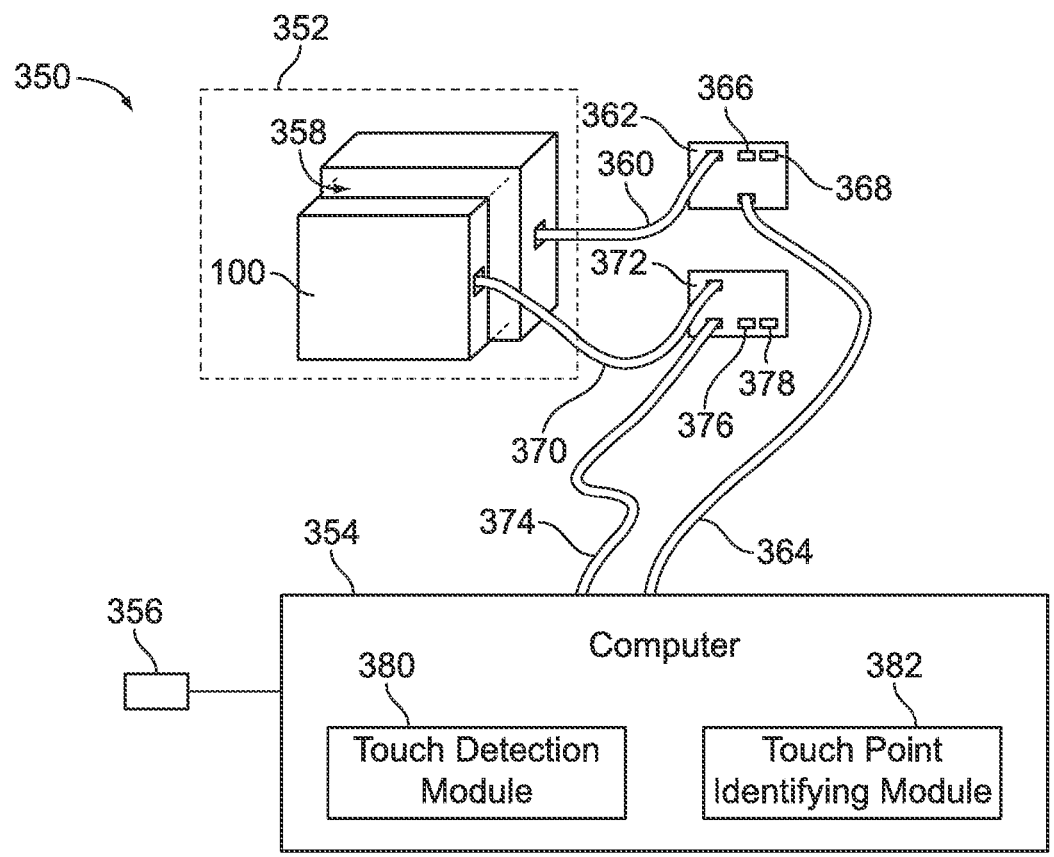
FIG. 8 illustrates a block diagram of a SAW touch display system having a touch display interconnected with a computer in accordance with an embodiment of the present invention.

FIG. 8 illustrates a block diagram of a touch display system 350 having a touch display 352 interconnected with a computer 354. The computer 354 may run one or more applications, such as gaming and entertainment, family-style home computing systems, visualization and manipulation of medical images, signature input or other handwriting input, input to a machine such as a copy machine, retail store and restaurant cash registers, and the like. In addition to the touch display 352, the computer 354 may comprise an alternate user input 356 such as a keyboard and/or a mouse. Although indicated separately, the components of the touch display system 350 may be within a single unit, such as a personal digital assistant (PDA), phone, camera or other portable device.

The touch display 352 includes components for displaying data on a display screen 358. The display screen 358 may be an LCD, cathode ray tube (CRT), Plasma, OLED display, photographic image and the like. A touch panel, such as the touch panel 100 of FIG. 1 or the touch panel 200 of FIG. 3, may be installed over the display screen 358. It should be understood that with the embodiment of FIG. 4 wherein the flexible display layer 252 (for example OLED display layer or EPD display layer) is part of the coversheet 270 of the touch panel 250, no display screen 358 is used. In another embodiment, the touch panel 100 may be located physically separate from the display screen 358, such as to function as a track pad.

A display cable 360 connects the touch display 352 with a display controller 362. The display controller 362 receives video information from the computer 354 over video cable 364. The video information is received and processed by the display controller 362, then transferred to the touch display 352 over the display cable 360 for display on the display screen 358. It should be understood that the touch display 352 and the display controller 362 may be hardwired together or interconnected such that the display cable 360 is not required. The display controller 362 comprises components such as a central processing unit (CPU) 366 and a memory 368.

A touch panel cable 370 interconnects the touch panel 100 with a touch panel controller 372. The touch panel controller 372 sends and receives information to and from the computer 354 over touch data cable 374. Touch information is received by the touch panel 100, transferred over the touch panel cable 370 to the touch panel controller 372, and then sent over the touch data cable 374 to the computer 354. The touch panel controller 372 includes components such as a CPU 376 and memory 378. The touch data cable 374 and video cable 364 may be replaced by wireless technology.

A touch detection module 380 detects one or more touches on the touch panel 100. Each touch generates a corresponding X coordinate and Y coordinate, and in some embodiments, a U coordinate. When multiple touches are detected simultaneously, the touch detection module 380 detects multiple X, Y, and optionally U coordinates that are used by touch point identifying module 382 to pair appropriate X and Y coordinate pairs. While touch detection module 380 and touch point identifying module 382 are shown as residing in computer 354, these modules may equally be located in touch panel controller 372 or elsewhere within the touch display system 350. Therefore, it should be understood that the embodiment illustrated in FIG. 8 is illustrative only and is not meant to be limiting.

Figure 9:
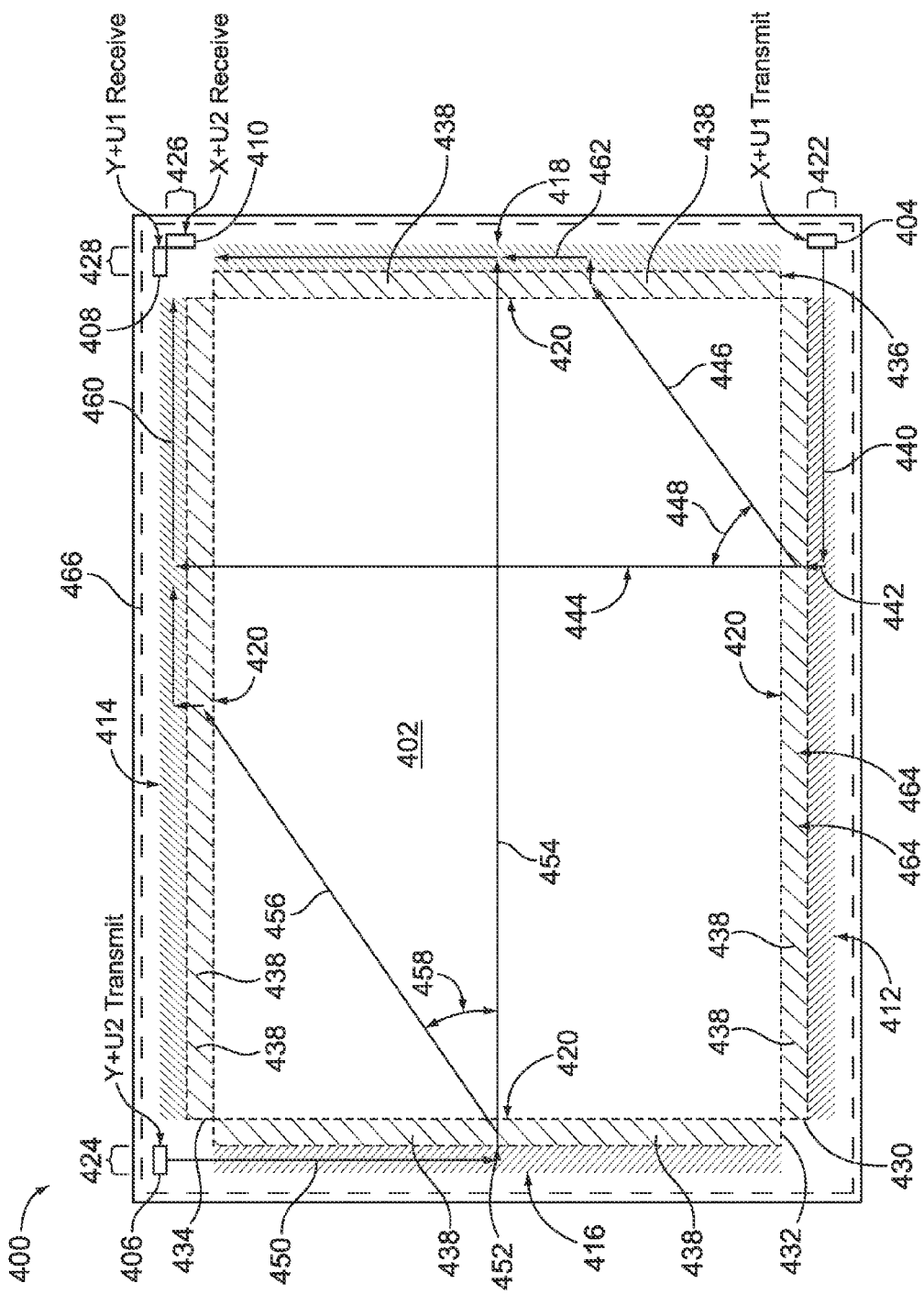
FIG. 9 illustrates a substrate of a SAW touch panel having exemplary transducers and arrays thereon that may be used to detect one touch or multiple simultaneous touches in accordance with an embodiment of the present invention.

FIG. 9 illustrates a top view of an example of a SAW touch panel that may be used, in conjunction with the coversheet described above, to detect one touch or multiple simultaneous touches. Dotted line 466 indicates a border area along outer edges of substrate 400 wherein the coversheet (not shown) may be mounted or bonded to the substrate 400, as discussed with respect to FIG. 5.

The substrate 400 of the touch panel supports propagation of surface acoustic waves or beams and may be glass, metal, low-acoustic-loss polymer, or other materials as discussed above. The substrate 400 has a touch area 402 that is located in a central portion of the substrate 400. X and Y transmit transducers 404 and 406 and Y and X receive transducers 408 and 410 are mounted on the substrate 400. The transmit transducers 404 and 406 and receive transducers 408 and 410 may be wedge transducers, grating transducers, interdigital transducers, or any other type of transducer. The transmit transducers 404 and 406 excite surface acoustic waves in the substrate 400. The excited surface acoustic wave may also be referred to as the transmitted beam or transmitted SAW beam. First and second X arrays 412 and 414 and first and second Y arrays 416 and 418 are mounted and/or fabricated on the substrate 400 proximate to outer edges 420 of the touch area 402. X array 412 and Y array 416 deflect transmitted beams or waves towards the touch area 402, such as at 90 degrees. X array 414 and Y array 418 deflect beams from the touch area 402, such as at 90 degrees. The X transmit transducer 404 and the first X array 412 may together be considered as a first transmitter 422, and the Y transmit transducer 406 and the first Y array 416 may together be considered as a second transmitter 424. The X receive transducer 410 and the second X array 414 may together be considered as a first receiver 426 and the Y receive transducer 408 and the second Y array 418 may together be considered as a second receiver 428.

In one embodiment, first, second, third and fourth beam splitters 430, 432, 434 and 436 optionally may be fabricated (such as, but not limited to, etched or deposited) on the substrate 400 between the first and second X arrays 412 and 414 and the first and second Y arrays 416 and 418, respectively, and the touch area 402. Each of the first, second, third and fourth beam splitters 430-436 have a plurality of deflecting elements 438. The beam splitters 430-436 are used to generate the U component of the signal, and thus may not be needed in embodiments where only X and Y are being detected. For example, the beam splitters 430-436 may be used in embodiments to support multiple simultaneous touches.

For example, the transmit transducer 404 transmits SAW beam 440 along the first X array 412. The first X array 412 deflects portions of the SAW beam 440 at a 90 degree angle, such as illustrated with deflected beam 442. The deflected beam 442 enters the first beam splitter 430 and is split by the deflecting elements 438 into at least two different beams, such as undeflected beam 444 and U deflected beam 446. (Alternatively, the first X array 412 may deflect the SAW beams 440 by 143 degrees such that the deflected beam 442 enters the first beam splitter 430 parallel to the illustrated U deflected beam 446. In this example, the first beam splitter 430 would pass undeflected the portion of the deflected beam 442 as the U deflected beam 446 while deflecting the undeflected beam 444.) It should be understood that there are a large number of deflected beams 442 formed along the length of the first X array 412 which results in a large number of undeflected beams 444 and U deflected beams 446 to sense touch events within the touch area 402 of the substrate 400. The undeflected beam 444 continues along the same path and direction as the deflected beam 442 and the U deflected beam 446 is transmitted along the U or diagonal direction.

Similarly, the Y transmit transducer 406 transmits SAW beam 450 of which portions are deflected by the first Y array 416 at 90 degrees as deflected beam 452. The deflected beam 452 enters the second beam splitter 432 and is split into undeflected beam 454 and deflected U beam 456. The undeflected beam 454 continues on the original path of the deflected beam 452 while the deflected U beam 456 is deflected at an angle 458 with respect to the undeflected beam 454 or wave, such as at approximately 37 degrees.

The undeflected beam 444 travels across the touch area 402 and passes through the third beam splitter 434. The second X array 414 deflects the undeflected beam 444 at 90 degrees to form return beam 460 that is received by the X receive transducer 410. The U deflected beam 446 is transmitted diagonally across the touch area 402 and encounters the fourth beam splitter 436. The fourth beam splitter 436, in this case, does split the incoming beam, but only the deflected portion is used. The fourth beam splitter 436 receives multiple beams that have been split and are thus entering the fourth beam splitter 436 at different angles with respect to each other. The fourth beam splitter 436 deflects the U deflected beam 446 at approximately 37 degrees. The deflected U beam enters the second Y array 418 and is deflected by 90 degrees toward the Y receive transducer 408 as return beam 462.

First through fourth beam splitters 430-436 may be of any construction that provides the desired beam splitting functionality. In one embodiment, the beam splitters 430-436 may be fabricated simultaneously or separately with the reflective arrays 412-418 using the same materials and processes. The beam splitters 430-436 may have the same or different height as the reflective arrays 412-418. Alternatively, the deflecting elements 438 of the beam splitters 430-436 may comprise reflective line segments 464 of deposited material or etched glass.

In other embodiments, XYU array designs may have separate transmit U arrays along each transmit side of the substrate 400 that are directly illuminated by separate transmit transducers, and receive U arrays that directly illuminate separate receive transducers.

The aforementioned coversheet embodiments may be used with different operating frequencies. For example, a higher operating frequency may be selected to support multi-touch applications. At higher frequencies, a thinner SAW supporting substrate may be used and in some embodiments sensitivity may be increased. At lower frequencies, a larger over-all sensor size may be achieved, which may also allow easier manufacturing for transducers and array structures.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A touch panel, comprising:
    a surface acoustic wave propagating substrate having top and bottom surfaces; and
    a multi-layer coversheet configured to be positioned over the substrate, the coversheet comprising:
        a load-spreading layer having top and bottom surfaces, the top surface configured to receive touch input from an object;
        a compliant layer having top and bottom surfaces, the top surface of the compliant layer configured to be coupled to the bottom surface of the load-spreading layer; and
        an anti-sticking layer having top and bottom surfaces, the top surface of the anti-sticking layer configured to be coupled to the bottom surface of the compliant layer, the bottom surface of the anti-sticking layer configured to be positioned proximate to the top surface of the substrate.

2. The touch panel of claim 1, wherein the anti-sticking layer comprises non-stick properties.

3. The touch panel of claim 1, wherein the anti-sticking layer comprises a thin layer of stiff material.

4. The touch panel of claim 1, wherein the anti-sticking layer is a coating comprising non-stick properties.

5. The touch panel of claim 1, wherein the coversheet further comprises at least one additional layer or coating.

6. The touch panel of claim 1, wherein the coversheet is substantially transparent.

7. The touch panel of claim 1, wherein the compliant layer comprises an elastomeric material and the load-spreading layer comprises a material that is relatively stiff with respect to the elastomeric material.

8. The touch panel of claim 1, wherein the substrate comprises at least one of metal, glass, ceramic or a composite material.

9. The touch panel of claim 1, wherein the load-spreading layer comprises glass, glass microsheet or Polyethylene Terephthalate (PET).

10. The touch panel of claim 1, wherein the anti-sticking layer is coupled to the compliant layer using at least one of coating, evaporation, spraying, dipping, plasma treatment, laminating, printing, heat and co-extrusion.

11. The touch panel of claim 1, wherein the coversheet further comprises an additional compliant layer and an additional load-spreading layer between the load-spreading layer and the compliant layer, wherein the additional compliant layer has top and bottom surfaces, wherein the top surface of the additional compliant layer is configured to be coupled to the bottom surface of the load-spreading layer, wherein the additional load-spreading layer has top and bottom surfaces, wherein the additional load-spreading layer is configured to be stiffer than the additional compliant layer, wherein the top surface of the additional load-spreading layer is configured to be coupled to the bottom surface of the additional compliant layer, and wherein the bottom surface of the additional load-spreading layer is configured to be coupled to the top surface of the compliant layer.

12. The touch panel of claim 1, wherein the load-spreading layer is between 50 microns and 600 microns thick, and wherein the compliant layer is at least 75 microns thick.

13. A touch panel, comprising:
    a surface acoustic wave propagating substrate having top and bottom surfaces; and
    a multi-layer coversheet configured to be positioned over the substrate, the coversheet comprising:
        a flexible display layer having top and bottom surfaces and configured to display an image, the top surface of the flexible display layer configured to receive touch input from an object;
        a compliant layer having top and bottom surfaces, the top surface of the compliant layer configured to be coupled to the bottom surface of the flexible display layer; and
        an anti-sticking layer having top and bottom surfaces, the top surface of the anti-sticking layer configured to be coupled to the bottom surface of the compliant layer, the bottom surface of the anti-sticking layer configured to be positioned proximate to the top surface of the substrate.

14. The touch panel of claim 13, wherein the flexible display layer comprises an organic light-emitting diode (OLED) display layer.

15. The touch panel of claim 13, wherein the flexible display layer comprises an electrophoretic display (EPD) layer.

16. The touch panel of claim 13, wherein the anti-sticking layer comprises non-stick properties.

17. The touch panel of claim 13, wherein at least one of the substrate, the compliant layer or the anti-sticking layer comprise substantially opaque materials.

18. The touch panel of claim 13, wherein the anti-sticking layer comprises a thin layer of stiff material.

19. The touch panel of claim 13, wherein the anti-sticking layer is a coating having non-stick properties.

20. The touch panel of claim 13, wherein the anti-sticking layer is coupled to the compliant layer using at least one of coating, evaporation, spraying, dipping, plasma treatment, laminating, printing, heat and co-extrusion.

* * * * *